UNITED STATES PATENT OFFICE.

SAMUEL PEACOCK, OF PHILADELPHIA, PENNSYLVANIA, ASSIGNOR TO INTERNATIONAL AGRICULTURAL CORPORATION, OF NEW YORK, N. Y., A CORPORATION OF NEW YORK.

MIXED VOLATILE COMPOUNDS AND PROCESS OF PRODUCING SAME.

1,129,514.     Specification of Letters Patent.     Patented Feb. 23, 1915.

No Drawing.     Application filed April 18, 1914. Serial No. 832,811.

*To all whom it may concern:*

Be it known that I, SAMUEL PEACOCK, a citizen of the United States, residing at Philadelphia, in the county of Philadelphia and State of Pennsylvania, have invented certain new and useful Improvements in Mixed Volatile Compounds and Processes of Producing Same; and I do hereby declare the following to be a full, clear, and exact description of the invention, such as will enable others skilled in the art to which it appertains to make and use the same.

This invention relates to a process of decomposing natural phosphates, and recovering substantially all of their contained phosphorus while at the same time forming volatile compounds containing fixed carbon and nitrogen having a high fertilizing value.

The object of the invention is to attain the above results in a simple, expeditious and comparatively inexpensive manner; and to these ends the invention consists in the novel steps constituting my process as will be more fully hereinafter disclosed and particularly pointed out in the claims.

In carrying out my process, I finely divide a natural phosphate rock, such as the tricalcium phosphate $Ca_3P_2O_8$, and mix the same with finely divided carbon in suitable proportions, when the mixture is heated by any suitable means in an atmosphere of nitrogen to a temperature of, say, between 1500° C. and 1600° C., when it will be found that the reaction, which really begins at about 1200° C., spreads until substantially all the phosphorus is displaced or driven off as a phosphorus bearing gas, vapor or sublimate. At the same time, in the case of calcium and similar phosphates the alkali earth metal bases remaining in the furnace are converted into carbo-nitrids. I have discovered that the product thus formed is partly volatile and partly solid at the temperature of formation, and the proportion of volatile product to solid product is dependent, in a measure, upon the pressure existing at the time in the furnace. That is to say, if the pressure is above that of the atmosphere and the partial pressures of the products of the reaction are allowed to accumulate a less proportion of volatile to solid product will be formed than is the case for the same period of reaction when the pressure is at that of the atmosphere; And, further, if the pressure is below that of the atmosphere and the partial pressures diminished, the maximum proportion of volatile to solid product will be formed in a less time. The reaction seems to proceed in accordance with the following equation:—

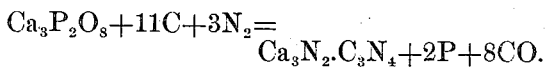
$$Ca_3P_2O_8 + 11C + 3N_2 = Ca_3N_2 \cdot C_3N_4 + 2P + 8CO.$$

The principles of this equation further seem to be generally applicable to all metal phosphates. To illustrate using a phosphate of aluminum, the equation becomes:—

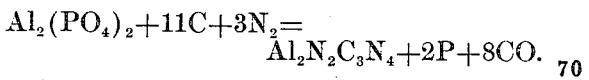
$$Al_2(PO_4)_2 + 11C + 3N_2 = Al_2N_2C_3N_4 + 2P + 8CO.$$

An analysis of the volatile and solid products of the furnace shows them to contain in combination the following proportions of the elements, in the cases of an alkali earth metal and aluminum phosphate being employed.

|  | Calcium product. | Aluminum product. |
|---|---|---|
| Metal | 50% | 31% |
| Carbon | 15% | 21% |
| Nitrogen | 35% | 48% |

The pressure being normal and the temperature about 1600° C. the volatile product will combine about 80% of the total base present in about 45 minutes.

Should it be desired to produce ammonia from my product it is only necessary to subject my carbo-nitrid product to the action of hot water in an autoclave at 200° C., when ammonia will be produced in accordance with the following equation, when an aluminum carbo-nitrid is employed:

$$Al_2N_2 \cdot C_3N_4 + 9H_2O = Al_2O_3 + 3CO_2 + 6NH_3.$$

When an alkali earth metal carbo-nitrid is employed of course this equation will be correspondingly changed.

The phosphorus which has been driven off at the high temperatures is found to exist chiefly in the free state, but also in the form of oxids, nitrids and probably carbids. That portion of the phosphorus found in the free state may be recovered as such, by condensation in water.

In order to reduce the temperatures at which the reaction will proceed I may reduce the partial pressures of the gaseous reaction products by any suitable means, for example, as by carrying out the process in an air tight furnace, and pumping out the evolved gases at suitable intervals. But I prefer to accomplish the same end by causing nitrogen gas to flow over the mixture and thereby carrying off said evolved gases to an extent sufficient to lower the partial pressure to the desired point, say to 200 millimeters of mercury or less.

The evolved volatile products containing phosphorus and carbo-nitrid, may be led together from the furnace into a suitable chamber and there condensed to a solid form, for further treatment with water, but I prefer to lead the gases directly into water. If said products are thus recovered in water the free phosphorus will separate out and the carbo-nitrid will dissolve, whereupon the solution may be heated to 200° C. in a closed vessel and the evolved ammonia recovered.

A further advantage of recovering the volatile products in water resides in the fact that any insoluble compounds of phosphorus and nitrogen that might be present are also easily separated from the soluble products. The solid portions of the carbo-nitrid that are formed simultaneously with the volatile products and which remain in the furnace residue may be likewise treated with water at 200° C. and their evolved ammonia recovered. The insoluble free phosphorus and phosphorus compounds thus recovered may be burned in air and the products thus obtained treated with water to produce phosphoric acid.

It is obvious that those skilled in the art may vary the details of my process without departing from the spirit thereof, and therefore I do not wish to be limited to the above disclosures except as may be required by the claims.

What I claim is:—

1. The process of decomposing phosphate rock to produce phosphorus and volatile carbo-nitrids which consists in preparing a suitable mixture of said rock and carbon; subjecting said mixture in an atmosphere of nitrogen to a temperature sufficient to produce said phosphorus and carbo-nitrids in a volatile condition; leading said volatile products from the furnace; and suitably recovering the same, substantially as described.

2. The process of decomposing phosphate rock to produce a mixture of phosphorus and carbo-nitrid bearing vapors which consists in preparing a mixture of said rock and carbon; subjecting said mixture in an atmosphere containing nitrogen and free from chemically active oxygen to a temperature sufficient to produce said phosphorus and carbo-nitrid bearing vapors; leading said vapors from the furnace; and suitably separating said phosphorus from said carbo-nitrids, substantially as described.

3. The process of decomposing phosphate rock to produce a mixture of phosphorus and carbo-nitrid bearing vapors which consists in preparing a mixture of said rock and carbon; subjecting said mixture in an atmosphere containing nitrogen and free from chemically active oxygen to a temperature of 1500° C. to produce said phosphorus and carbo-nitrid bearing vapors; leading said vapors from the furnace; and suitably separating said phosphorus from said carbo-nitrids, substantially as described.

4. The process of simultaneously fixing nitrogen and producing phosphorus, which consists in preparing a finely divided mixture of carbon and phosphate rock; and subjecting said mixture in an atmosphere containing nitrogen but devoid of free oxygen to a temperature sufficient to free the phosphorus, and to chemically fix the nitrogen, while diminishing the normal partial pressures of the reaction products, substantially as described.

5. The herein described new composition of matter containing phosphorus mixed with a carbo-nitrid, the said mixture being volatile at its temperature of formation, capable of oxidizing in the air, the contained carbo-nitrid being capable of separation from the phosphorus when dissolved in water and also capable of evolving ammonia when said solution is heated to 200° C., substantially as described.

In testimony whereof I affix my signature, in presence of two witnesses.

SAMUEL PEACOCK.

Witnesses:
   T. A. WITHERSPOON,
   FRANCES SIEBEL.